Figure 8:
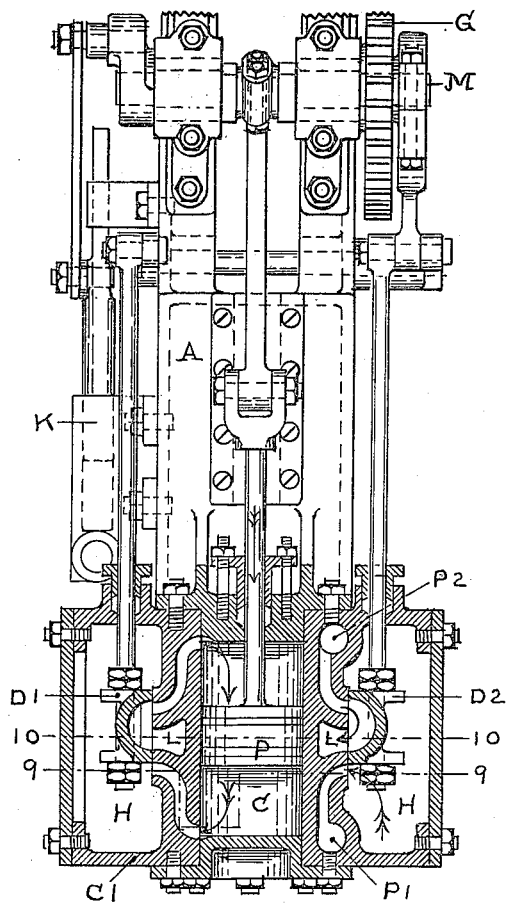

C. O. PALMER.
COMPRESSED AIR APPARATUS FOR OPERATING PNEUMATIC TOOLS.
APPLICATION FILED SEPT. 17, 1907.
1,154,794.
Patented Sept. 28, 1915.
4 SHEETS—SHEET 1.
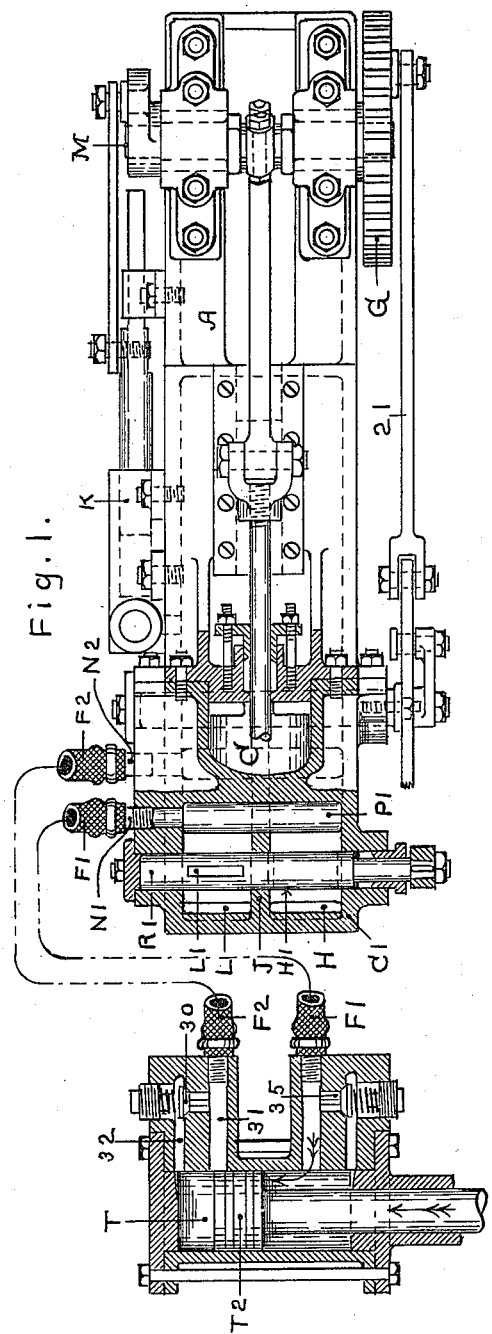
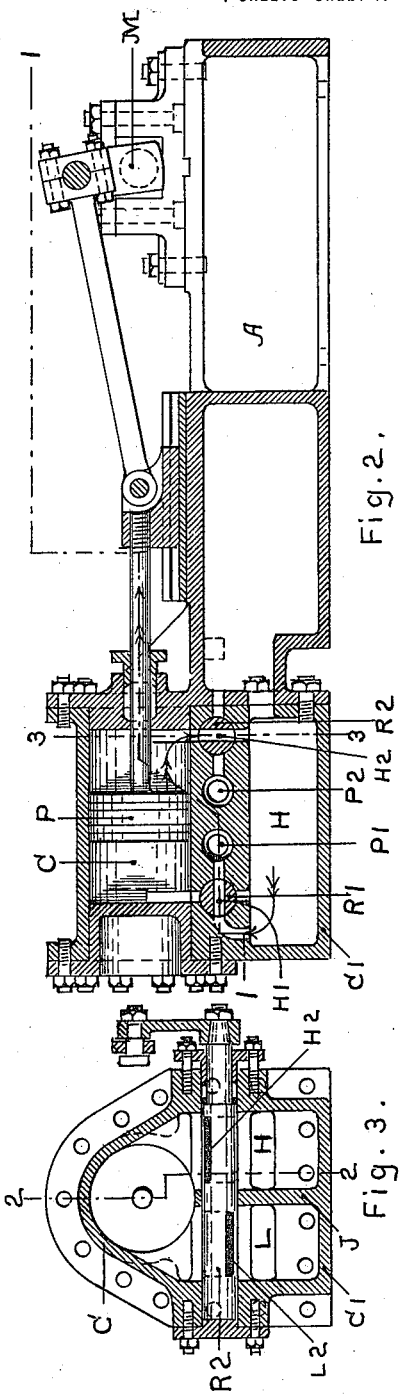
Witnesses:
Inventor:
C. O. Palmer.

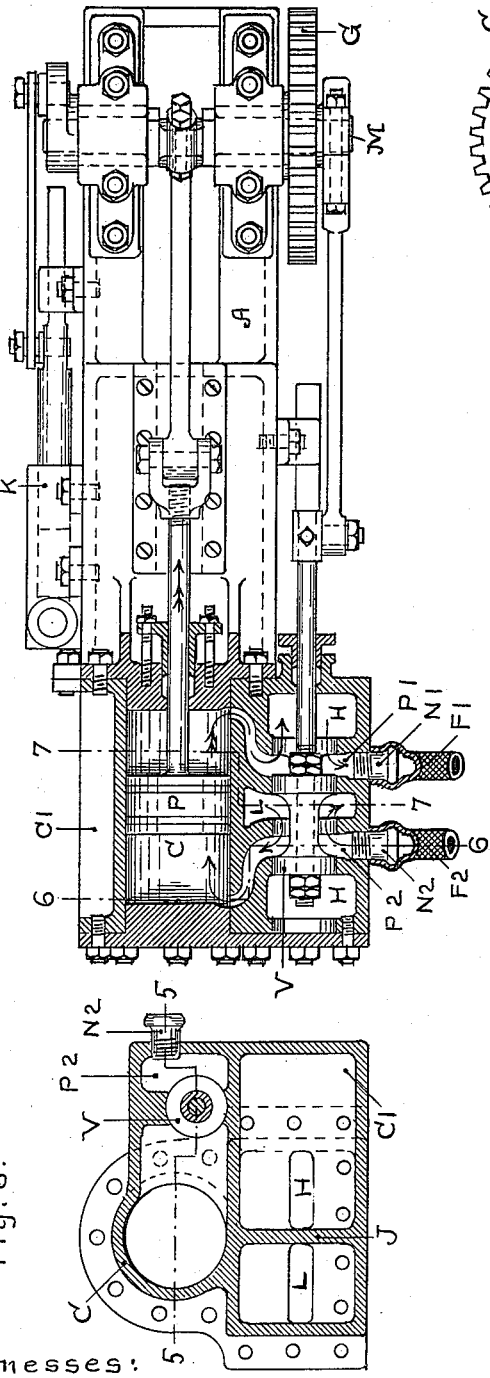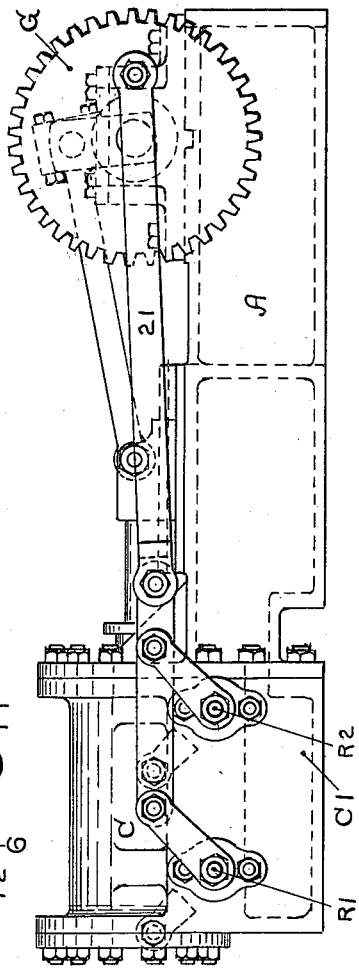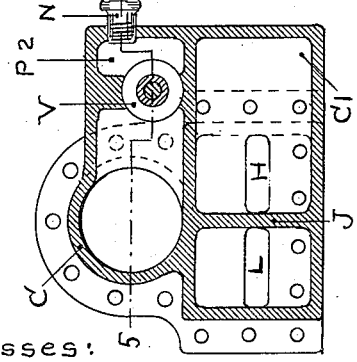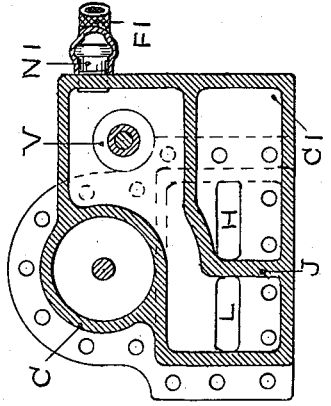

C. O. PALMER.
COMPRESSED AIR APPARATUS FOR OPERATING PNEUMATIC TOOLS.
APPLICATION FILED SEPT. 17, 1907.

1,154,794.

Patented Sept. 28, 1915.
4 SHEETS—SHEET 3.

Witnesses:

Inventor:
C. O. Palmer.

C. O. PALMER.
COMPRESSED AIR APPARATUS FOR OPERATING PNEUMATIC TOOLS.
APPLICATION FILED SEPT. 17, 1907.
1,154,794.
Patented Sept. 28, 1915.
4 SHEETS—SHEET 4.
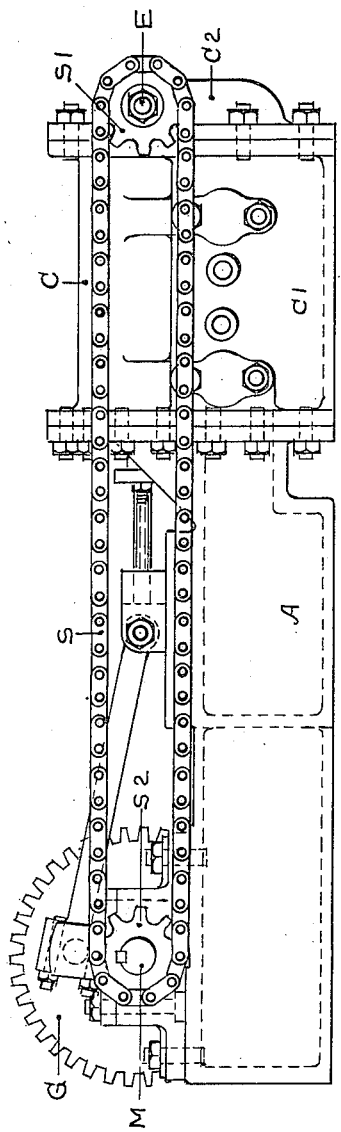
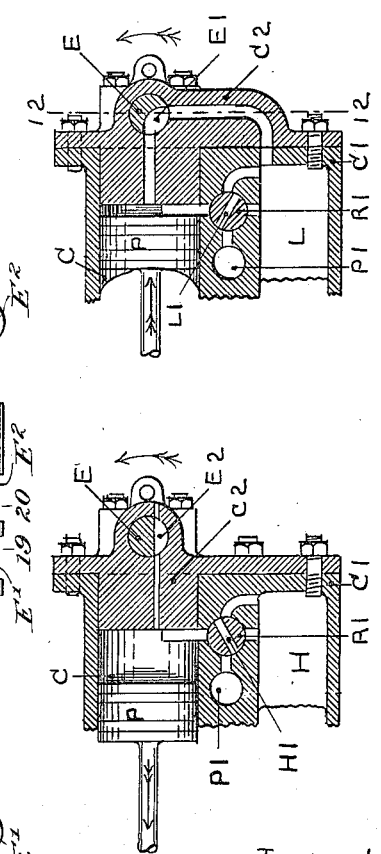
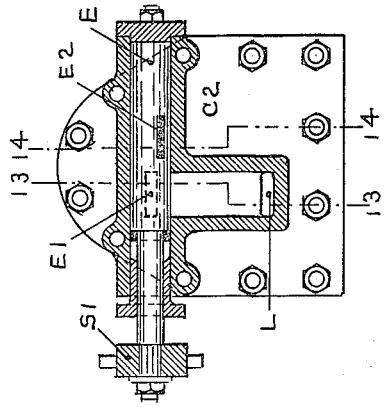
Witnesses:
Inventor:
C. O. Palmer.

UNITED STATES PATENT OFFICE.

CHARLES O. PALMER, OF CLEVELAND, OHIO.

COMPRESSED-AIR APPARATUS FOR OPERATING PNEUMATIC TOOLS.

1,154,794.    Specification of Letters Patent.    Patented Sept. 28, 1915.

Application filed September 17, 1907. Serial No. 393,386.

*To all whom it may concern:*

Be it known that I, CHARLES O. PALMER, a citizen of the United States of America, and a resident of Cleveland, in the county of Cuyahoga and State of Ohio, have invented certain new and useful Improvements in Compressed-Air Apparatus for Operating Pneumatic Tools, of which the following is a specification.

My invention relates to that class of pneumatic tools employing a reciprocating piston, and is especially applicable to those that work a long distance from the steam plant that is the prime source of power. Such for instance as rock drills and coal mining machines.

Among the objects sought are, to simplify the tool itself, to produce a powerful elastic stroke, to give reciprocating impulses to the tool piston whether stalled or free, to abolish the troubles arising from heat in the compressor and the cold in the exhaust, to produce simple and effective valve mechanism as well as a compact and convenient construction and arrangement of the air chambers within the compressor frame.

Roughly stated, my invention consists of the following combination and arrangement of parts, a low pressure air chamber, a high pressure air chamber, an air compressor taking air from the low pressure chamber and delivering it to the high pressure chamber. A reciprocating pneumatic tool, of which a reciprocating mining machine may serve as an example, is located near the compressor and connected to the same by two tubes, one leading to each end of the tool cylinder. These tubes together with the channels from the compressor cylinder, form a passageway, in which are located one or more positively driven valves, that are operated independent of the tool piston but preferably in step with the compressor piston. This places the said passageways reversely in connection with said chambers, so that the high pressure chamber is connected only with the high pressure side, and the low-pressure chamber only with the low-pressure side, of the tool piston, at each stroke of said tool piston. This forms a closed air system from which more or less air escapes into the atmosphere through stuffing boxes and other leaks. To supply this loss and to charge the system, a charging valve E (see Figures 11 to 14 inclusive) is added to one end of the compressor cylinder which enables the main compressor to supply this air itself without an extra compressor. Otherwise a small secondary compressor K (see Figs. 1, 5 and 8) that derives its power from the compressor or motor is provided, which takes air from the atmosphere and compresses it into any part of the closed system.

My invention consists also in certain details of construction hereafter described and pointed out in the claims.

Figure 16:
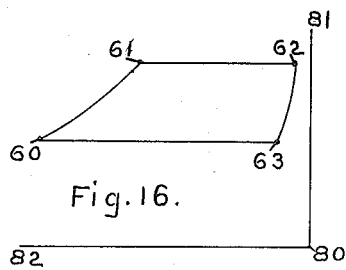
Figure 17:
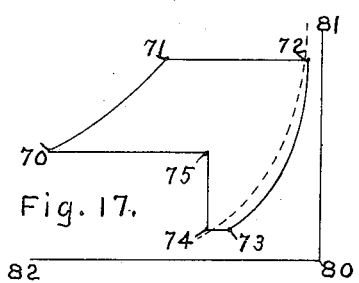
Figure 15:
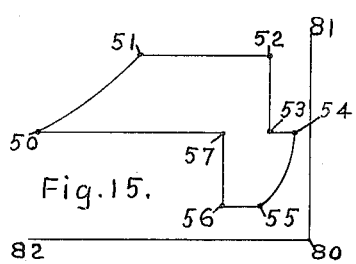
Figure 9:
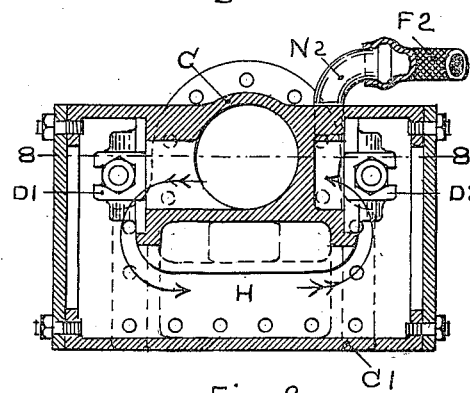
Figure 10:
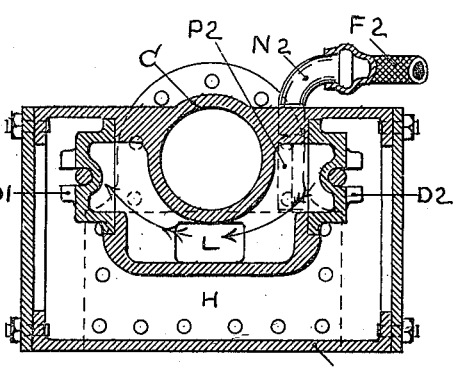

In the accompanying drawings forming part of this application;—Fig. 1 is an irregular sectional view of the construction taken approximately on line 1—1 of Fig. 2 of a compressed air apparatus embodying my invention having rotary valves; Fig. 2 is a vertical longitudinal section of the compressor shown in Fig. 1 taken approximately on line 2—2 of Fig. 3; Fig. 3 is a transverse section of the compressor taken approximately on line 3—3 of Fig. 2; Fig. 4 is a view of the right side of the air compressor shown in Fig. 1; Fig. 5 is a top view partially in section on line 5—5 of Fig. 6 of an air compressor embodying my improvements designed with a unitary valve structure; Fig. 6 is a transverse section taken on line 6—6 of Fig. 5; Fig. 7 is a transverse section on line 7—7 of Fig. 5; Fig. 8 is a top view partly in section on line 8—8 of Fig. 9 of an air compressor embodying my improvements designed with slide valves; Fig. 9 is a section on line 9—9 of Fig. 8; Fig. 10 is a section on line 10—10 of Fig. 8; Fig. 11 is a view of the left side of an air compressor similar to Fig. 1 in which the secondary compressor is omitted, and the charging valve is added, to the rear end of the compressor cylinder; Fig. 12 is a rear view of the charging valve on line 12—12 of Fig. 13; Fig. 13 is a longitudinal section on line 13—13 of Fig. 12 of the end of the compressor cylinder shown in Fig. 11 provided with the charging valve; Fig. 14 is a longitudinal section on line 14—14 of Fig. 12 of the end of the compressor cylinder; Fig. 15 is an indicator diagram of the rear end of the compressor cylinder shown in Figs. 11 to 14 inclusive; Fig. 16 is an indicator diagram of the forward end of the compressor cylinder; Fig. 17 is a diagram of the end of a compressor cylinder having a charging valve opening to the atmosphere but not to the low pressure chamber; Fig. 18 is a side view of the associated or charging valve E in detail; Fig. 19 is a section on line 19—19 of Fig. 18; Fig. 20 is a section on line 20—20 of Fig. 18.

Similar characters denote similar parts throughout the several views.

The arrows on the pistons of the various figures show the direction of motion of the pistons themselves, and the arrows in the air passages the direction the air is moving at the time.

H denotes the high pressure air chamber or passage and L the low pressure air chamber or passage.

I will now briefly refer to my invention as applied to a coal mining machine of the pick type and from which other applications will readily be understood.

The prime mover is usually a steam engine located outside the mine near the entrance at a considerable distance from the work to be done. The engine runs a dynamo from which electric wires are strung through the mine and carried to the working face of the coal. On a car, not shown, is placed the air compressor which is driven by an electric motor through the gear on the main shaft of the compressor.

The tool is a mining machine (which is of the pick type) and has a cylinder T (shown in diagram in Fig. 1) which is situated within striking distance of the working face of the coal, and is connected with the air chamber by short passageways, F1 and F2. The said car with its motor and air compressor remains stationary on the track while the mining machine undercuts the coal in one room. The pick mining machine must not only move from "setting" to "setting" while the room is being cut, but must be continually shifted under the intelligent direction of the operator so that each blow of the pick may be on such a point as to best accomplish the work. If the point of attack is not continually shifted, the pick would become stalled and the work stop. Both the continual shifting of the direction of action, and the severe work to which it is subjected, make it desirable that the tool be as light and simple as practicable. Conversely, the compressor always remaining on the truck and the truck being on the rails where it is easily transported, it may be much heavier and more complicated than the coal mining machine, and still be easily managed. I have therefore sought to simplify and lighten the tool or mining machine by relieving it of the valve mechanism by which its supply of air is regulated by placing the valve on the car and operating it from the air compressor. The movement of the tool operating valve being independent of the movement of the tool piston, regulates the air supply to the tool, so as to give it alternately forward and backward impulses when the tool piston is stalled in the rock, because the air compressor continues to run regardless of the working of the tool.

The air compressor and tool are connected by flexible tubes as above stated, so that the exhaust of the tool cylinder is returned to the low pressure air chamber of the air compressor, and from thence it passes into the compressor cylinder.

My closed air apparatus is more advantageously operated at a high than at a low pressure, and to raise the pressure of the whole system and to supply the air that leaks out, a small secondary air compressor K of ordinary pattern is provided, which is driven by the same motor as the principal compressor.

The compressor frame is preferably formed in two parts, one the bed plate A carrying the crank cross head, etc., and the other, the cylinder casting C1 carrying the piston, the valves, etc. In the base of the frame are formed two adjoining chambers for compressed air, one for high and one for low pressure. In the form of frame shown in Figs. 1 and 4 the dividing wall J between the air chambers comprises a central, vertical, longitudinal partition which also forms a brace to withstand the strains imposed by the cross head and other working parts. It also facilitates the dissipation of the heat from the high pressure or compression chamber, into the adjoining cool low pressure or exhaust chamber.

I will first refer to Figs. 1 to 4 inclusive. Secured on the main shaft is the gear G which is driven by a pinion on an electric motor (not shown). It is thus connected to actuate the main crank that drives the compressor piston P and the crank that drives the secondary compressor K. The piston P reciprocates in the compressor cylinder C. In the base of the cylinder casting C1 is the high pressure air chamber H and the low pressure air chamber L. Between the cylinder C and the said air chambers are the rotary valves R1 and R2 that are each provided with a rocker arm and are operated from the main shaft by a valve rod 21 as shown in Figs. 1 and 4. Each valve is preferably formed with two separate gates; one gate opens into the high pressure chamber H and the other gate opens into the low pressure chamber L. Adjacent to the valve R1 is formed the port P1 in the passageway F1. The valve R1 controls communication between both the high and low pressure air chambers and one end of both the tool and compressor cylinders and the other valve R2 controls communication between the said air chambers and the other end of said cylinders. The arrows in the air spaces show the direction of air when the piston is moving as indicated by the arrow on the piston rod. The compressor as shown in Fig. 2 is receiving air through gate L1 of valve R1 from the low pressure chamber and forcing air through the gate H2 of valve R2 into the high pressure chamber. At the same time air is escaping from the high-pressure air chamber H through gate H1 of valve R1 to the port P1 of passageway F1 to the tool cylinder T. Also the exhaust air from the tool T is escaping through passageway F2 by port P2 and gate L2 of valve R2 to the low pressure chamber L.

On the opposite stroke of the compressor piston P the valves are rotated to the position shown in dotted lines in Fig. 4 when the positions of the valve gates are reversed from that as shown in Fig. 2, and gate H2 is horizontal and gate H1 is vertical and the direction of the air is changed accordingly. This forms a closed air circuit in which the air is used over and over again.

In Figs. 5, 6 and 7 is shown my invention as applied to a compressor having a unitary valve structure. So that one valve with its double system of ports answers for both the compressor and tool cylinders. This is accomplished by having one set of ports lead to the compressor cylinder as shown in Fig. 5 while the other set composed of ports P1 and P2 lead into and form part of the passageways F1 and F2 that connect with the opposite ends of the tool cylinder.

As shown in Fig. 5 the high pressure chamber communicates with the ends of the valve and the low pressure chamber with the middle of the valve. As shown by the arrows in Fig. 5 the compressor is receiving air from the low pressure air chamber at the rear end of the cylinder and compressing air into the high pressure chamber at the forward end. The compressed air is also escaping from the high pressure chamber by port P1 and the nipple N1 to the tool, and the exhaust air is escaping from the tool to the low pressure chamber by port P2 and the nipple N2. The piston as indicated by the arrow on the piston rod is moving toward the forward end of the cylinder. On the return stroke of the compressor piston, the valve V is moved to the opposite end of its stroke and the direction of the air as shown by the arrows and above described is reversed.

In Figs. 8, 9 and 10 are shown an air compressor embodying my invention designed for using two ordinary D slide valves; the valve D1 controlling communication with the compressor and the valve D2 controlling the air to the tool. The frame is divided into two parts, the forward part the bed plate A carries the main shaft, cross head etc., while the rear part the cylinder casting C1 carries the piston and valves. In the base of the bed plate A is formed the low pressure air chamber L and in the base of the cylinder casting C1 the high pressure chamber H.

As shown by the arrows in the air passage in Fig. 8 the compressor is receiving air from the low pressure chamber L through the valve D1 and compressing it into the high pressure chamber through the opposite end of same valve. The air escapes from the high pressure chamber H through valve D2, port P1 and passageway F1 (as in Fig. 1) to the tool cylinder. The exhaust air from the tool cylinder (also as in Fig. 1) escapes by the passageway F2 and port P2 to the low pressure air chamber L of Fig. 10. The piston in the meantime is moving forward as shown by the arrow on the piston rod. When the piston is reversed the valves are also reversed to correspond, and the direction of air also is reversed from that shown by the arrows and just described. The valves D1 and D2 are operated from the main shaft as shown in Fig. 8.

By putting a valve in the end of the main air compressor as shown in Figs. 11 to 14 inclusive I am able to eliminate the secondary compressor K entirely and make the cylinder C supply what outside air is necessary for the system. As shown in said figures a charging valve E is placed near one end of the cylinder and controls communication between the end of said cylinder and the low pressure chamber, also between the cylinder and the atmosphere.

The stem of the charging valve E has a sprocket wheel S1 secured thereon and is driven from the main shaft by the sprocket wheel S2 and the sprocket chain S. The valve stem is provided with two gates E1 and E2. The gate E1 shown in Fig. 13 communicates with the low pressure chamber L and is opened just before the piston reaches the end of the cylinder but of course after the gate H1 of the valve R1 opening to the high pressure chamber H has been closed (which is done before the piston P reaches the end of its stroke); said gate E1 remains open until the piston reaches the end of the cylinder when it closes, and the end of the cylinder remains closed until the air in the cylinder has been allowed to expand slightly below atmospheric pressure. Then the other gate E2 of the valve opens communication between the cylinder and the atmosphere as shown in Fig. 14 and the piston P draws in what little outside air is needed. This gate E2 then closes and gate L1 of the valve R1 opens, allowing the air from the low pressure chamber L to fill the cylinder in the rear of the piston.

The timing of the valves will be best understood by referring to the indicator diagram of the rear end of the cylinder which is shown in Fig. 15. In this as in the other diagrams the horizontal distance from line 80—81 represents the volume of contained air in the end of the cylinder. The vertical distance above line 81—82 represents the pressure corresponding to that volume. The horizontal distance from line 80—81 to the closed diagram represents the volume of clearance of the cylinder not traversed by the piston. Consequently the base line 80—82 in each instance represents zero pressure and the vertical line 80—81 represents zero volume.

Starting with the piston at the forward end of the cylinder at point 50 of the diagram the pressure therein is that of the low pressure chamber L. The valves are all closed and the piston advances toward the rear end compressing the inclosed air until it reaches the pressure of the high pressure cylinder at point 51 then the gate H1 of the valve R1 opens into the high pressure chamber. The piston then forces the air into the high pressure chamber until point 52 is reached near the end of the stroke when the said gate H1 to the high pressure chamber is closed and the gate E1 of valve E opens to the low pressure chamber, see Fig. 13, and the air escapes into the chamber and the pressure falls to that of the low pressure chamber L at point 53 of the diagram. Gate E1 stays open until the piston reaches the end of the cylinder at point 54 when it closes. The piston now travels toward the forward end of the cylinder the air expanding and the pressure falling until it reaches atmospheric pressure at point 55. The port E2 (of valve E) now opens to the atmosphere (as shown in Fig. 14) from point 55 to 56 when it is closed and the gate L1 of the valve R1 opens to the low pressure chamber and the pressure in cylinder C raises to that of the low pressure chamber at point 57. The gate L1 remains open until about the point 50 is reached at the end of the stroke which was our starting point then it closes.

Fig. 16 is an approximate indicator diagram of the forward end of the cylinder which is simpler as it has no charging valve. The compression is from 60 to 61 and the expansion from 62 to 63. These are both regulated by the valve R2 whose gates are L2 and H2.

I have here shown the charging valve E as a compound valve one gate E1 opening to the low pressure chamber and the other gate E2 opening to the atmosphere. In Fig. 17 is an indicator diagram of the compressor cylinder having a charging valve that opens to the atmosphere but not to the low pressure chamber, i. e. the gate E1 is omitted. Here the gate H1 of the valve R1 closes at the end of the stroke and corresponds with the point 72 of the diagram. Expansion then begins and continues to point 73 when atmospheric pressure is reached and the gate E2 of the charging valve E is opened to the atmosphere from 73 to 74 (as in Fig. 14) when it is closed and the valve R1 opens to the low pressure chamber the same as described for Fig. 15.

Should the initial pressure at the beginning of the stroke be above the point 72 the expansion would follow the dotted line of Fig. 17 and strike the atmospheric line nearer the point 74 and less outside air would be admitted. Conversely, if the initial pressure was below the point 74 the expansion line would strike the atmospheric line 73—74 at a point at the right of the point 73 and more outside air would be admitted by the charging valve because the suction would be greater. The same reasoning applies to the expansion line 54—55 of Fig. 15. This tends to prevent undue pressure in the closed system. The amount of clearance space in the compressor also limits the pressure attainable by the air compressor as is well known.

It is more desirable to have the expansion begin at the pressure of the low pressure chamber as shown in Fig. 15 than that of the high pressure chamber as shown in Fig. 17 because the pressure in the cylinder reaches atmospheric pressure point at 55 much earlier in the stroke than the point 73 is reached. So that from point 55 the pressure falls more rapidly below the atmospheric pressure and therefore the action of sucking in outside air is performed with greater vigor and certainty. The valve opening to the atmosphere may be of the ordinary kind operated by air pressure and opening inwardly toward the cylinder.

I have here shown one of the oldest and simplest forms of rotary valves but it is obvious that other forms of rotary valves may be substituted therefor without departing from the nature of my invention.

It is common practice to operate the valves of air compressors by air pressure, and such valves may be substituted for valve D1 of Figs. 8, 9 and 10, or valve E of Figs. 11 to 14 inclusive, without departing from certain features of my invention. The proper action of air operated valves, however, may be interfered with by the valve parts becoming gummed up by reason of accumulated oil and dirt. The valves I have shown are positively actuated, and they can be relied upon to act under conditions where the air itself, or an opposing spring, would not have sufficient force to operate the valve properly. Moreover, with the rotary type of valve shown, there is practically no chance that any foreign material will interfere with the tightness of the valve, since there is no valve-seat upon which dirt may lodge, and so prevent the valve from closing.

By having the passageways F1 and F2 from the tool communicate directly with the high pressure chamber the pressure in the chamber is lowered only by the amount of air used to fill the tool cylinder and connecting passageways. This is entirely independent of the compressor cylinder which is operated as above described.

Coal picks (or mining machines) as well as rock drills frequently get wedged in the material and require time to dislodge them, whereas they would work themselves loose if the piston were given intermittent impulses to loosen it. When the motion of the valve is controlled by the movement of the piston, as is common in rock drills, and the piston is stalled as just mentioned, the valve necessarily is stalled also. But with the valve operated by the compresser independently of the tool piston, said valve is still operated when the piston is stalled and the tool is given intermittent impulses to loosen it.

I have here shown three different styles of compressor for carrying out my invention. The difference between them being largely in the style of valves used. The rotary valve, the piston valve and the ordinary D slide valve. Each is advocated and condemned because of certain advantages or disadvantages it possesses and which it is not necessary to discuss here.

I have not in this application fully claimed the construction shown in Figs. 5, 6 and 7 as it forms part of the subject matter of my application for a patent for compressed air apparatus for operating pneumatic tools, Serial No. 514,029, filed August 21, 1909.

There is also another well known apparatus for operating rock drills, etc., in which the tool cylinder is connected by tubes to the pressor cylinder which is without valves. This system is designated as having "no valve movement" to distinguish it and because of its simplicity in this particular. The said "no valve movement" system has this disadvantage compared to mine, that the pressure of the material against the end of the tool tends to shove the piston to the back end of the cylinder by letting the air slip by the piston and so "unbalance" the system as it is technically called. When out of balance the movement of the tool piston is restricted to a short stroke with an accompanying push against the material. This produces a light inelastic blow, and consequently is of little effect. To restore the pneumatic balance requires a manually operated valve or some special but well known device. My system however is free from this objection, as it is always in pneumatic balance (if I may apply the term) without these special devices.

By using the air over and over so frequently, the troubles due to the heat of compression are largely eliminated by the cold due to expansion of the exhaust air. Besides, the operators are not exposed to the injurious effects of a current of cold air from the exhaust and the attendant ill smelling odors from the lubricated cylinders of the machine.

Referring again to Fig. 1, the operation of the cushioning valve 30 of the tool is as follows: When the piston T2 is driven by the compressed air in the forward end of the cylinder, as shown by the arrow, reaches the port 31, it closes said port so the exhaust air cannot escape, but is compressed to cushion the stroke so the piston cannot strike the back end of the cylinder. To drive the piston forward however, the compressed air from chamber H is directed through the tube F2 to the under side of check valve 30, and reaches the port 32 at the extreme end of the cylinder behind the piston, and forces it to the front end of the cylinder, where it is cushioned through the operation of the check valve 35 in the same manner.

Other forms of framework well known in the art, although less desirable, are perfectly feasible and other structural details will readily suggest themselves to those familiar with the art.

I accordingly claim the following as my invention:—

1. In a closed pneumatic tool system, the combination with an air compressor cylinder and the cylinder of a reciprocatory pneumatic tool, of fluid pressure connections between the ends of said cylinders, a high pressure chamber and a low pressure chamber interposed in said connections, and valve mechanism for interchanging said chambers in said connections.

2. In a closed pneumatic tool system, the combination with an air compressor cylinder and the cylinder of a reciprocatory pneumatic tool, of fluid pressure connections between the ends of said cylinders, a high pressure chamber and a low pressure chamber interposed in said connections, and valve mechanism for interchanging said chambers to simultaneously include said high pressure chamber in one of said connections and said low pressure chamber in the other of said connections.

3. In a closed pneumatic tool system, the combination with a compressor cylinder and the cylinder of a reciprocatory pneumatic tool, of fluid pressure connections between the ends of said cylinders, said parts constituting an oscillating system, a high pressure chamber and a low pressure chamber interposed in said connections, and valve mechanism for interchanging the connection of said high pressure chamber with one side of said system during the pressure stroke of said compressor on that side and for completing the connection of said low pressure chamber with the other side of said system simultaneously.

4. In a closed pneumatic tool system, the combination with an air compressor cylinder and piston and the cylinder of a reciprocatory pneumatic tool, of fluid pressure connections between the ends of said cylinders, said parts constituting an oscillating system, a high pressure chamber and a low pressure chamber interposed in said connections, and positively actuated valves for interchanging the connection of said high pressure chamber with the compression side of said system and said low pressure chamber with the other side of said system in each direction of movement of said compressor piston.

5. In a closed pneumatic tool system, the combination with an air compressor cylinder and piston and the cylinder of a reciprocatory pneumatic tool, of fluid pressure connections between the ends of said cylinders, said parts constituting an oscillating system, a high pressure chamber and a low pressure chamber interposed in said connections, valve ports included in the connections with said chambers, double ported valve mechanism coöperating with said valve ports for interchanging the connection of said high pressure chamber with the compression side of said system and said low pressure chamber with the other side of said system in each direction of movement of said compressor piston.

6. In apparatus of the class described, the combination with a low and a high pressure air chamber, of an air compressor connected with said chambers, a reciprocatory pneumatic tool located near the compressor, two passageways connected therewith, one leading to each end of the tool cylinder, one or more valves located on the compressor and controlling said passageways; mechanism independent of the said tool for operating said valve or valves and secondary means for charging and maintaining a pressure in said chambers.

7. In an apparatus of the class described, the combination with a high and a low pressure air chamber, of air compressor mechanism, a reciprocatory pneumatic tool located near the compressor, two connecting passageways, a double ported valve on the compressor operated independently of said tool, said valve being adapted to control communication between said air chambers and tool, and secondary means for charging and maintaining a pressure in said air chambers.

8. In an apparatus of the class described, the combination with a high and a low pressure air chamber, of an associated air compressor, a reciprocatory pneumatic tool, two connecting passageways, one leading to each end of the tool cylinder, a rotary valve at each end of the compressor cylinder, said valves being double-gated, one gate communicating with the high pressure air chamber and the other gate with the low pressure air chamber but both gates communicating with both of the ports leading to the compressor cylinder and said passageways, and secondary means for charging and maintaining a pressure in said air chambers.

9. In apparatus of the class described, the combination with a pneumatic tool cylinder of an air compressor cylinder, reciprocatory pistons in said cylinders, air chambers associated therewith, air passages connecting the air chambers with the ends of said cylinders forming a closed air system, a positively operated valve in each of said passages, a crank shaft on the compressor, a crank on the crank shaft, mechanism connecting the crank and compressor piston, an eccentric on the main shaft, mechanism connecting the eccentric with the said valves, a motor adapted to rotate the main shaft and an auxiliary air compressor adapted to form and maintain a pressure in the system.

10. In apparatus of the class described, the combination with a pneumatic tool cylinder, of an air compressor cylinder, reciprocatory pistons in said cylinders, air chambers associated with the cylinders, air passages connecting said chambers with the ends of said cylinders forming a closed air system, a positively operated double-ported valve in each of said passages, a crank shaft on the compressor, a crank on the crank shaft, mechanism connecting said crank and compressor piston, and positively operated mechanism connecting said crank and compressor piston, and positively operated mechanism driving the said valves from the main shaft, substantially as set forth.

11. In a compressor for gases, the combination with a bed containing high and low pressure chambers, of a longitudinal metallic wall positioned within said bed to separate said chambers and stiffen the bed, a compression cylinder mounted at one end of the bed, a crank shaft mounted at the other end of the bed, a piston positioned within the cylinder, a connecting rod uniting the same to the crank shaft, and valve mechanism mounted to be actuated from the crank shaft, substantially as set forth.

12. In apparatus of the class described, the combination with a reciprocatory pneumatic tool, of a reciprocatory gas compressor associated therewith and adapted to actuate said tool, separate high and low pressure chambers connected with said compressor, controlling valve mechanism therefor, and positively driven associated valve mechanism adapted intermittently to open the system to an external supply of air, substantially as set forth.

13. In apparatus of the class described, the combination with a reciprocatory fluid compressor, of a reciprocatory tool associated therewith, valve mechanism upon the compressor controlling the flow of the fluid to and from said tool, and additional valve mechanism positively driven to open the system intermittently to the external fluid supply, substantially as set forth.

14. In apparatus of the class described, the combination with compressor mechanism, of associated high and low pressure chambers, a pneumatic tool associated directly with said chambers, and additional valve mechanism positively driven to open the system intermittently to the exterior fluid supply, substantially as set forth.

15. In a pneumatic tool system, the combination with a reciprocatory fluid compressor, of associated high and low pressure chambers, a reciprocatory pneumatic tool associated with said chambers, controlling valve mechanism for actuating the tool, and a rotary valve driven by the compressor and intermittently opening the same to the external air, substantially as set forth.

16. In apparatus of the class described, the combination with a reciprocatory pneumatic tool, of a reciprocatory air compressor associated therewith and adapted to actuate said tool, separate high and low pressure air chambers connected with said compressor, valve mechanism controlling the flow of fluid to and from the tool, and associated valve mechanism adapted to intermittently open the compressor cylinder first to the low pressure air chamber and then to the atmosphere, substantially as set forth.

17. In apparatus of the class described, the combination with a reciprocating pneumatic tool, of a reciprocatory air compressor associated therewith and adapted to actuate said tool, separate high and low pressure air chambers connected with said compressor, a double ported charging valve on the compressor cylinder adapted intermittently to open said cylinder first to the low pressure air chamber then to the atmosphere, and a positive driving connection from the main shaft of the said air compressor to said charging valve, substantially as set forth.

18. In apparatus of the class described, the combination of a reciprocatory pneumatic tool, of a reciprocatory air compressor associated therewith and adapted to actuate said tool, an associated valve on the compressor cylinder adapted intermittently to open said cylinder to the atmosphere, and a sprocket chain driving connection from said associated valve to the main shaft of said air compressor, substantially as set forth.

19. In apparatus of the class described, the combination with a reciprocatory tool mechanism, of an associated reciprocatory gas compressor adapted to actuate said tool mechanism, a port opening to the external air, a rotary valve for controlling said port, and positively driven means connected with the gas compressor for rotating said valve positively to open and close the port intermittently, substantially as set forth.

20. In an alternating pressure system for pneumatic tools, the combination with a reciprocatory pneumatic tool, of a reciprocatory air compressor associated therewith and adapted to actuate said tool, separate high and low pressure air chambers connected with said compressor, valve mechanism associated therewith, and means for positively actuating said valve-mechanism to control communication between the compressor cylinder and each air chamber, substantially as set forth.

21. In a closed air system of the class described the combination with an air compressor cylinder and piston therein, an air chamber, ports connecting the chamber with both ends of the compressor cylinder, a compressor valve in both of said compressor cylinder ports, passageways connecting the air chamber and both ends of the tool cylinder, a tool valve in both tool cylinder passageways, a return pressure connection between said tool and compressor valves, and means for operating said valves in step with the compressor piston.

22. In a closed air system of the class described the combination with a compressor cylinder and piston therein, of a pneumatic tool cylinder and piston therein, an air chamber, ports connecting both ends of the compressor cylinder with the said air chamber, passageways connecting both ends of the tool cylinder with said air chamber, a compressor valve in both of said compressor ports, a tool valve in both of said passageways, a fluid pressure connection between said compressor and tool valves, means for reciprocating the compressor piston, means for operating said valves from a moving part of the compressor in step with the compressor piston, and means for supplying a fluid pressure in the system.

23. In apparatus of the class described the combination with a high and a low pressure air chamber, of an air compressor having its intake connected with the low pressure chamber and its outlet with the high pressure chamber, a reciprocatory pneumatic tool, passageways connecting both of said chambers with both ends of the tool cylinder, a valve in each of said passageways, and mechanism adapted to operate said valves in said passageways independent of the air pressure in said passageways substantially as described.

24. In a closed pneumatic system of the class described the combination with a high and a low pressure air chamber, of an air compressor connected to take air from the low pressure chamber and deliver it to the high pressure chamber, a reciprocatory pneumatic tool, passageways connecting both of said chambers with both ends of the tool cylinder, a valve in each of said passageways, mechanism adapted to operate said compressor piston, mechanism adapted to operate the valves in said passageways from a moving part of the compressor, and means for supplying compressed air to the system.

Signed at Cleveland, Ohio, this 29 day of Aug. 1907.

CHARLES O. PALMER.

Witnesses:
V. G. ARMSTRONG,
A. L. LAWRENCE.

Copies of this patent may be obtained for five cents each, by addressing the "Commissioner of Patents, Washington, D. C."